(12) United States Patent
Kim et al.

(10) Patent No.: US 11,703,449 B2
(45) Date of Patent: Jul. 18, 2023

(54) MICROORGANISM DETECTION APPARATUS

(71) Applicant: THE WAVE TALK, INC., Daejeon (KR)

(72) Inventors: Young Dug Kim, Gyeonggi-do (KR); Kyoung Man Cho, Seoul (KR)

(73) Assignee: THE WAVE TALK, INC., Daejeon (KR)

( * ) Notice: Subject to any disclaimer, the term of this patent is extended or adjusted under 35 U.S.C. 154(b) by 66 days.

(21) Appl. No.: 17/184,704

(22) Filed: Feb. 25, 2021

(65) Prior Publication Data

US 2021/0270735 A1 Sep. 2, 2021

(30) Foreign Application Priority Data

Mar. 2, 2020 (KR) .................. 10-2020-0025967

(51) Int. Cl.
*G01N 21/47* (2006.01)

(52) U.S. Cl.
CPC ..... *G01N 21/47* (2013.01); *G01N 2201/0231* (2013.01); *G01N 2201/06113* (2013.01)

(58) Field of Classification Search
CPC .............................. G01N 21/47; G01N 21/479
See application file for complete search history.

(56) References Cited

U.S. PATENT DOCUMENTS

| 5,983,711 | A | * | 11/1999 | Pappas | G01N 5/025 |
| | | | | | 73/76 |
| 6,519,032 | B1 | * | 2/2003 | Kuebler | G01N 21/532 |
| | | | | | 356/337 |
| 10,534,129 | B2 | * | 1/2020 | Tearney | A61B 5/0084 |
| 2018/0372608 | A1 | * | 12/2018 | Park | G01N 21/95607 |
| 2019/0041344 | A1 | * | 2/2019 | Lutz | F25B 21/02 |
| 2019/0107487 | A1 | | 4/2019 | Rahmlow et al. | |
| 2022/0155195 | A1 | * | 5/2022 | Winter | G01N 1/44 |

FOREIGN PATENT DOCUMENTS

| KR | 1020000064148 | | 11/2000 |
| KR | 1020160020766 | | 2/2016 |
| WO | WO-2021158700 | A1 * | 8/2021 |

\* cited by examiner

*Primary Examiner* — Hina F Ayub
(74) *Attorney, Agent, or Firm* — Stuart H. Mayer; Mayer & Williams PC (57) ABSTRACT

Provided is a microorganism detection apparatus including a body, a sample accommodator module provided in the body to accommodate a sample, a beam irradiation module for irradiating a beam to the sample, a sensor module for detecting speckles generated when the beam irradiated to the sample is scattered due to motion of bacteria or microorganisms included in the sample, and a controller for controlling the beam irradiated from the beam irradiation module, and storing and analyzing images detected by the sensor module, wherein the sample accommodator module includes a sample accommodation block having a sample hole capable of accommodating a container containing the sample, and a heater for supplying heat to the bacteria or microorganisms in the sample at a preset temperature.

9 Claims, 8 Drawing Sheets

MICROORGANISM DETECTION APPARATUS

CROSS-REFERENCE TO RELATED PATENT APPLICATION

This application claims the benefit of Korean Patent Application No. 10-2020-0025967, filed on Mar. 2, 2020, in the Korean Intellectual Property Office, the disclosure of which is incorporated herein in its entirety by reference.

BACKGROUND OF THE INVENTION

1. Field of the Invention

The present invention relates to a microorganism detection apparatus and, more particularly, to a microorganism detection apparatus capable of detecting motion of bacteria or microorganisms included in a target material by using laser speckles.

2. Description of the Related Art

Microorganisms or small organisms that affect human health are invisible to the eye, but exist around humans and cause various diseases. To measure such microorganisms, generally, microorganism culture, mass spectrometry, nuclear magnetic resonance, etc., are usable as methods of measuring bacteria or microorganisms. The microorganism culture, mass spectrometry, and nuclear magnetic resonance methods may precisely measure specific types of microorganisms but require a long sample preparation time and high-cost, precise, and complicated equipment.

In addition, optical methods such as Raman spectrometry and multispectral imaging are also usable to measure bacteria or microorganisms, but a complicated optical system, expert knowledge and laboratory-level facilities for handling the complicated optical system, and a long measurement time are required.

SUMMARY OF THE INVENTION

However, the existing optical methods for measuring bacteria or microorganisms require a complicated optical system, expert knowledge and laboratory-level facilities for handling the complicated optical system, and a long measurement time.

The present invention provides a microorganism detection apparatus capable of testing susceptibility of bacteria or microorganisms to antibiotics by detecting motion of the bacteria or microorganisms included in a target material by using changes in laser speckles. However, the scope of the present invention is not limited thereto.

According to an aspect of the present invention, there is provided a microorganism detection apparatus including a body, a sample accommodator module provided in the body to accommodate a sample, a beam irradiation module for irradiating a beam to the sample, a sensor module for detecting speckles generated when the beam irradiated to the sample is scattered due to motion of bacteria or microorganisms included in the sample, and a controller for controlling the beam irradiated from the beam irradiation module, and storing and analyzing images detected by the sensor module, wherein the sample accommodator module includes a sample accommodation block having a sample hole capable of accommodating a container containing the sample, and a heater for supplying heat to the bacteria or microorganisms in the sample at a preset temperature.

The sample accommodation block may include an irradiator accommodator provided at a side of the sample accommodation block and connected to the sample hole to accommodate at least a portion of the beam irradiation module, and an image detector provided at another side of the sample accommodation block and connected to the sample hole to allow the sensor module to detect an image scattered by the sample.

The heater may use a Peltier element or resistance heating.

The beam irradiation module may include a light source for generating the beam, a beam transferring medium for transferring the beam generated by the light source, and a beam emitter for irradiating, to the sample, the beam transferred by the beam transferring medium.

The light source may include a laser capable of irradiating a beam of a certain wavelength, and the beam transferring medium may include an optical fiber.

A plurality of sample holes may be provided in the sample accommodator module to accommodate a plurality of containers containing samples, and the beam irradiation module may further include a beam splitter for splitting the beam generated by a single light source, for a plurality of beam emitters.

The sample accommodator module may further include a ball plunger inserted into the sample accommodation block to press at least a portion of the container and fix the container to the sample accommodation block when the container is inserted into the sample accommodation block.

The microorganism detection apparatus may further include a case including a cover capable of covering the sample accommodator module not to expose the sample to an external environment when the container is put in the sample accommodator module for a test.

The container may be provided in an overall pillar shape having a top opening and a bottom surface, and include a beam entering part corresponding to the beam irradiation module and a beam receiving part corresponding to the sensor module, wherein the beam entering part and the beam receiving part are misaligned to amplify the speckles generated by the beam irradiation module and detected by the sensor module.

The controller may obtain a temporal correlation of the speckles by using the detected speckles, and estimate presence of viruses in the sample or a concentration of the viruses in real time based on the temporal correlation.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity or convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 1:
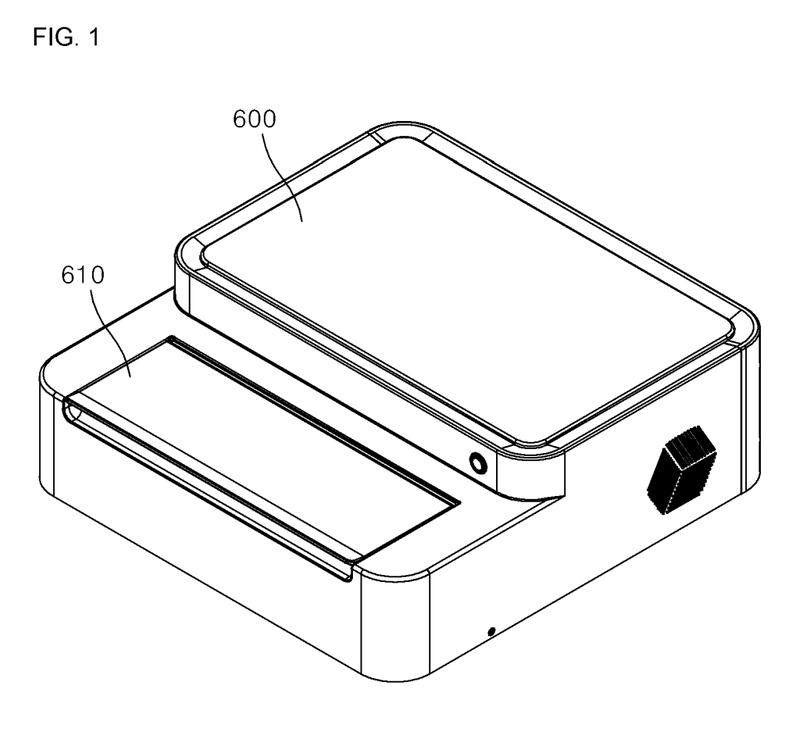
FIG. 1 is a perspective view of a microorganism detection apparatus according to an embodiment of the present invention.
Figure 2:
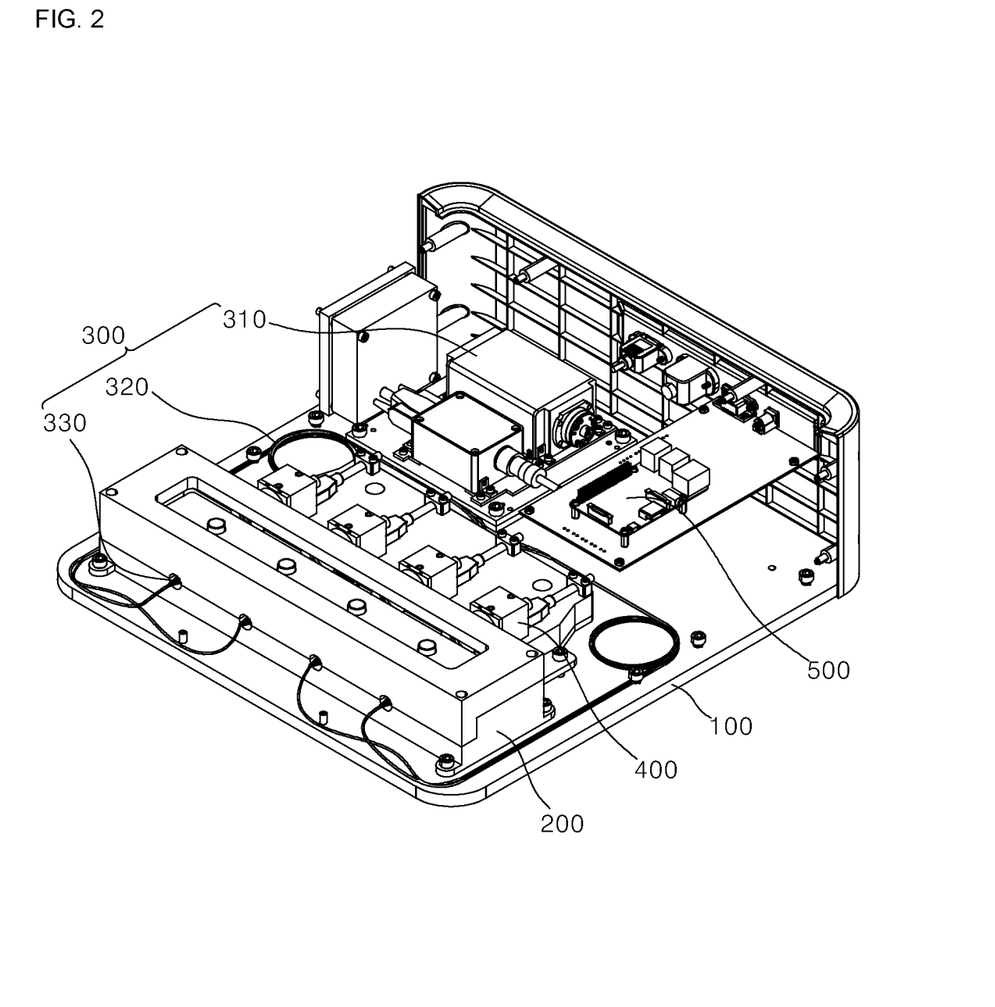
FIG. 2 is an internal perspective view of a microorganism detection apparatus according to an embodiment of the present invention.
Figure 3:
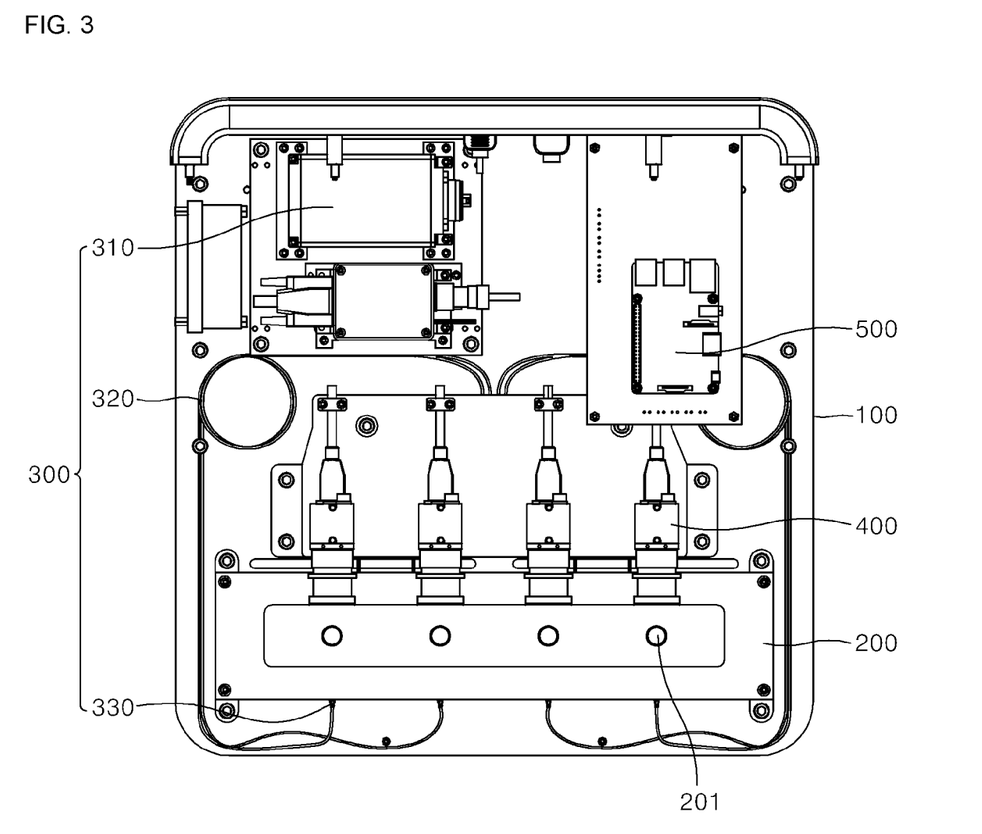
FIG. 3 is an internal top view of a microorganism detection apparatus according to an embodiment of the present invention.

FIG. 1 is a perspective view of a microorganism detection apparatus according to an embodiment of the present invention, FIG. 2 is an internal perspective view of FIG. 1, and FIG. 3 is a top view of FIG. 2.

Initially, as illustrated in FIGS. 1 to 3, the microorganism detection apparatus according to an embodiment of the present invention may mainly include a body 100, a sample accommodator module 200, a beam irradiation module 300, a sensor module 400, a controller 500, and a case 600.

Herein, for example, the body 100 may be a structure having a support space thereon to support the sample accommodator module 200, the beam irradiation module 300, the sensor module 400, and the controller 500, and having sufficient strength and durability to support the same.

As illustrated in FIGS. 2 and 3, the sample accommodator module 200 may be provided in the body 100 to accommodate a sample, and include a sample accommodation block 210 and a heater 220.

Figure 4:
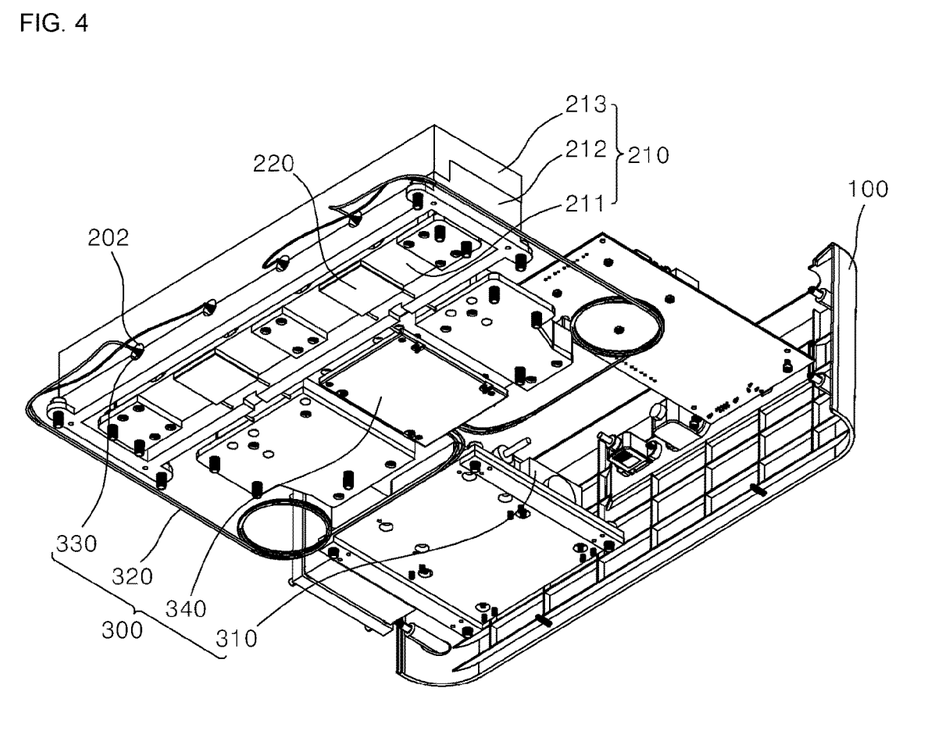
FIG. 4 is a bottom perspective view of the microorganism detection apparatus of FIG. 3.
Figure 5:
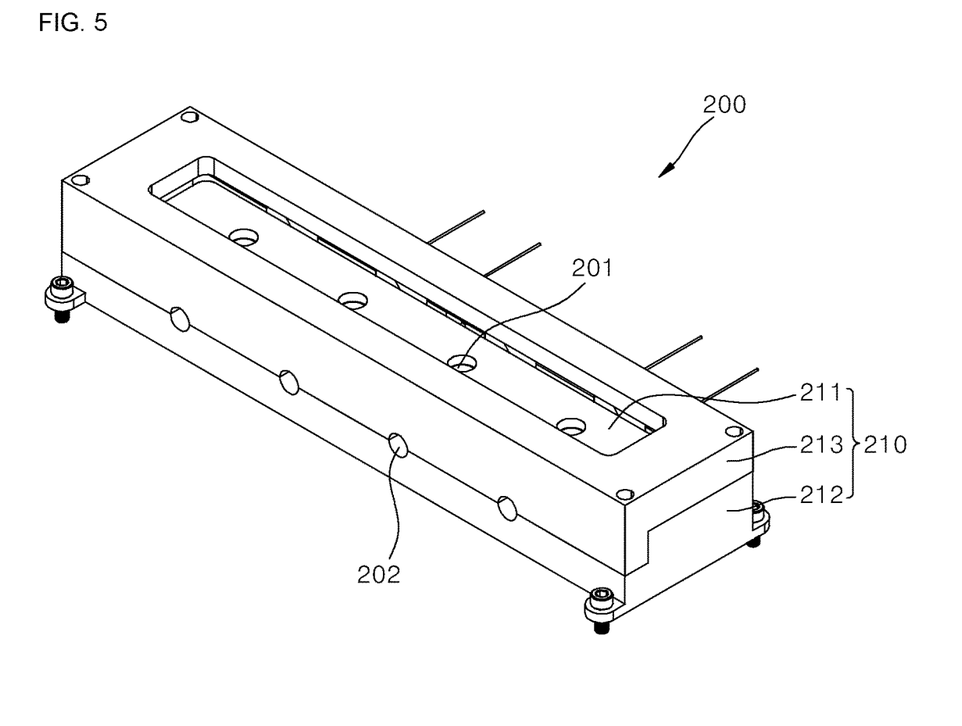
FIG. 5 is a perspective view of a sample accommodator module of FIG. 3.
Figure 6:
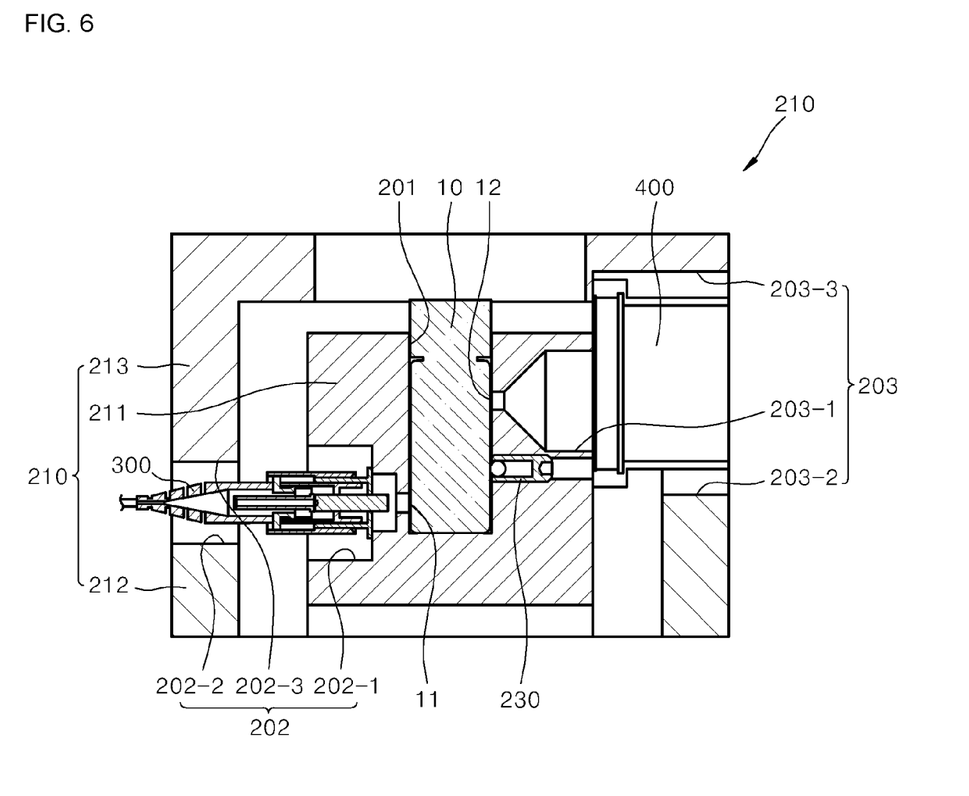
FIG. 6 is a cross-sectional view of the sample accommodator module of FIG. 3.

FIG. 4 is a bottom perspective view of the microorganism detection apparatus of FIG. 3, FIG. 5 is a perspective view of the sample accommodator module 200 of FIG. 3, and FIG. 6 is a cross-sectional view of the sample accommodator module 200.

As illustrated in FIGS. 4 to 6, the sample accommodation block 210 may have a sample hole 201 capable of accommodating a container 10 containing the sample, and include a block body 211, a first block 212, a second block 213, the sample hole 201, an irradiator accommodator 202, and an image detector 203.

The block body 211 may have the sample hole 201 at an upper side thereof. For example, the block body 211 may be provided in a hexahedron shape to include an upper surface having the sample hole 201 capable of accommodating the container 10 containing the sample, a side surface having a hole into which at least a portion of the beam irradiation module 300 is inserted, and another side surface having a hole capable of accommodating a condenser lens or at least a portion of the sensor module 400 to allow the sensor module 400 to receive a scattered beam.

In this case, the sample hole 201 may be provided in a hole shape capable of accommodating the sample and form a space capable of accommodating the sample, and the sample may be accommodated in the container 10 and the container 10 accommodating the sample may be inserted into the sample hole 201.

The sample may include a sample such as saliva, blood, or tissues, or an organic sample such as food.

The block body 211 may be made of aluminum having excellent thermal conductivity and high light reflectance. Aluminum may easily transfer heat for incubating, and be optically useful to reflect irradiated light.

The first block 212 may surround at least a portion of the block body 211, and support lower surfaces of at least portions of the beam irradiation module 300 and the sensor module 400 in contact.

For example, the first block 212 may have a seat for the block body 211 thereon, or both of the block body 211 and the first block 212 may be seated on and coupled to the body 100. In addition, the first block 212 may have a support or hole to support at least another portion of the beam irradiation module 300 at a side of the first block 212, and have another support or hole to support at least another portion of the sensor module 400 at another side of the first block 212.

The second block 213 may surround at least another portion of the block body 211, be in contact with upper surfaces of at least other portions of the beam irradiation module 300 and the sensor module 400, and be coupled to the first block 212 to fix the beam irradiation module 300 and the sensor module 400.

For example, the second block 213 may be coupled onto the first block 212 in an overall shape surrounding the block body 211. In addition, the second block 213 may be coupled to the first block 212 to press and fix upper and lower portions of the beam irradiation module 300 and the sensor module 400 supported by the first block 212.

The irradiator accommodator 202 may be provided at a side of the sample accommodation block 210 and be connected to the sample hole 201 to accommodate at least a portion of the beam irradiation module 300.

For example, in the irradiator accommodator 202, at least a portion of the beam irradiation module 300 is inserted into a side surface of the block body 211, at least another non-inserted portion thereof is surrounded by the first and second blocks 212 and 213, and thus a portion of the beam irradiation module 300 is inserted into a side of the sample accommodation block 210 in an overall shape.

Specifically, the irradiator accommodator 202 may include a first irradiator hole 202-1, a second irradiator hole 202-2, and a third irradiator hole 202-3.

The first irradiator hole 202-1 may be provided in a side surface of the block body 211 in a hole shape into which an end of the beam irradiation module 300 is inserted, the second irradiator hole 202-2 may be provided at a side of the first block 212 to surround a lower side of a portion of the beam irradiation module 300, and the third irradiator hole 202-3 may be provided at a side of the second block 213 to correspond to the second irradiator hole 202-2 and surround an upper side of the portion of the beam irradiation module 300.

That is, when the first and second blocks 212 and 213 are coupled to each other, the second and third irradiator holes 202-2 and 202-3 provided at a side of the first and second blocks 212 and 213 may be coupled to each other to face each other and form an irradiator through-hole, and an end of the beam irradiation module 300 may pass through the irradiator through-hole and be inserted into the first irradiator hole 202-1.

The image detector 203 may be provided at another side of the sample accommodation block 210 and be connected to the sample hole 201 to allow the sensor module 400 to detect an image scattered by the sample.

For example, in the image detector 203, at least a portion of the sensor module 400 is inserted into another side surface of the block body 211, at least another non-inserted portion thereof is surrounded by the first and second blocks 212 and 213, and thus a portion of the sensor module 400 is inserted into another side of the sample accommodation block 210 in an overall shape.

Specifically, the image detector 203 may include a first detection hole 203-1, a second detection hole 203-2, and a third detection hole 203-3.

The first detection hole 203-1 may be provided in another side surface of the block body 211 in a hole shape into which a portion of the sensor module 400 is inserted, the second detection hole 203-2 may be provided at another side of the first block 212 to surround a lower side of a portion of the sensor module 400, and the third detection hole 203-3 may be provided at another side of the second block 213 to correspond to the second detection hole 203-2 and surround an upper side of the portion of the sensor module 400.

That is, when the first and second blocks 212 and 213 are coupled to each other, the second and third detection holes 203-2 and 203-3 provided at another side of the first and second blocks 212 and 213 may be coupled to each other to face each other and form a sensor module through-hole, and a portion of the sensor module 400 may pass through the sensor module through-hole and be inserted into the first detection hole 203-1.

As illustrated in FIG. 4, the sample accommodator module 200 may include the heater 220.

The heater 220 may supply heat to bacteria or microorganisms in the sample at a preset temperature. For example, the heater 220 may minimize noise such as vibration by using a Peltier element or resistance heating.

Specifically, the microorganism detection apparatus of the present invention irradiates a beam to the sample and detects, by using the sensor module 400, speckles generated due to the bacteria or microorganisms included in the sample, and an incubating process is required to measure growth or reduction of the bacteria or microorganisms included in the sample.

In this case, the speckles detected by the sensor module 400 are sensitive to the flow of the bacteria or microorganisms included in the sample such that the flow needs to be constant, and speckle imaging is a very sensitive technique such that vibration caused in an ambient environment may be recognized as noise. Therefore, a Peltier element or resistance heating may be used for a vibration-free heating method.

As illustrated in FIG. 6, the sample accommodator module 200 according to an embodiment of the present invention may further include a ball plunger 230.

The ball plunger 230 may be inserted into the sample accommodation block 210 to press at least a portion of the container 10 and fix the container 10 to the sample accommodation block 210 when the container 10 is inserted into the sample accommodation block 210.

For example, the ball plunger 230 may be a mechanism including a spring, and be configured to fix the container 10 in the sample hole 201.

When the container 10 vibrates, the bacteria or microorganisms included in the sample may also vibrate to cause noise and the detected speckles may include the noise. When the noise serves as a signal, analysis of a sensitive speckle image may be greatly affected. That is, the ball plunger 230 may be used to fix the container 10 in the sample hole 201 and prevent detection of noise.

In this case, the container 10 may be provided in an overall pillar shape having a top opening and a bottom surface, and include a beam entering part 11 corresponding to the beam irradiation module 300 and a beam receiving part 12 corresponding to the sensor module 400, wherein the beam entering part 11 and the beam receiving part 12 are misaligned to amplify the speckles generated by the beam irradiation module 300 and detected by the sensor module 400.

For example, the container 10 may be made of a transparent material capable of transmitting light, such that a beam irradiated from the beam irradiation module 300 may enter the container 10 and the beam scattered by the sample in the container 10 may exit toward the sensor module 400.

Specifically, a side portion of the container 10 through which the beam is irradiated from the beam irradiation module 300 into the container 10 may serve as the beam entering part 11, and another side portion of the container 10 through which the beam exits from the container 10 toward the sensor module 400 may serve as the beam receiving part 12. In this case, the beam entering part 11 and the beam receiving part 12 may be misaligned with each other such that the beam irradiated from the beam irradiation module 300 may enter through the beam entering part 11 and be reflected in multiple directions in the container 10 to amplify the beam scattered by the bacteria or microorganisms included in the sample.

Figure 7:
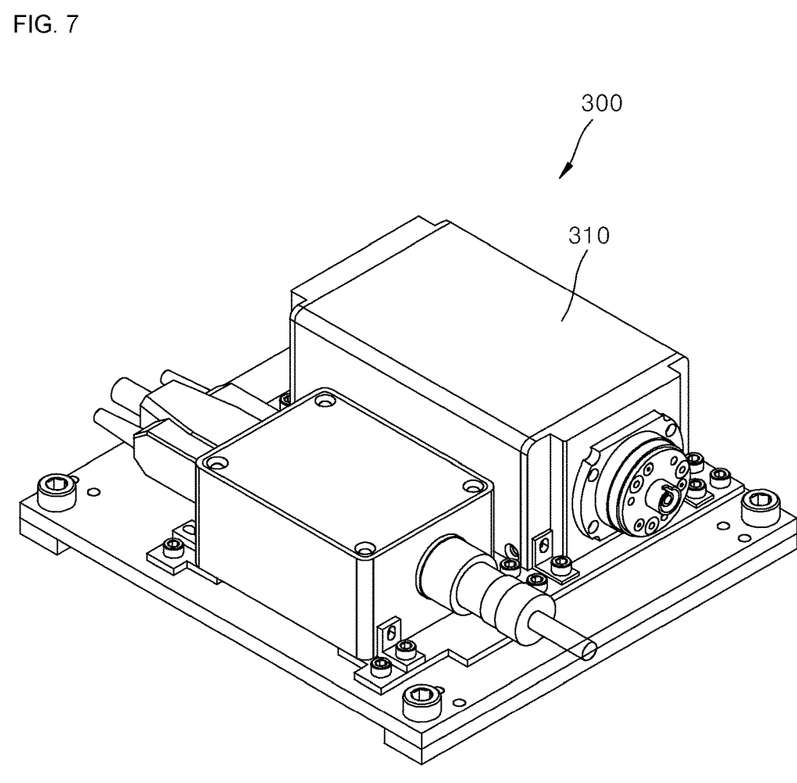
FIG. 7 is a perspective view of a beam irradiation module of FIG. 3.

FIG. 7 is a perspective view of the beam irradiation module 300 of the microorganism detection apparatus according to an embodiment of the present invention.

As illustrated in FIGS. 4 and 7, the beam irradiation module 300 may be configured to irradiate a beam to the sample, and include a light source 310, a beam transferring medium 320, a beam emitter 330, and a beam splitter 340.

The beam irradiation module 300 may irradiate the beam to the sample. In this case, the sample may include bacteria or microorganisms and thus have a non-uniform internal refractive index.

When the beam generated by the beam irradiation module 300 is irradiated to the sample, multiple scattering may occur in the sample due to the bacteria or microorganisms included in the sample. Waves scattered in complicated paths due to the multiple scattering may cause constructive or destructive interference therebetween, and the constructive or destructive interference between the waves may lead to a grain-shaped pattern called speckles.

The light source 310 may be a device for generating a beam, be supported on the body 100 to generate the beam to be irradiated to the sample, and use a laser beam having waves of a certain wavelength and good coherence to generate speckles by irradiating the beam to the sample. In this case, accuracy of measurement may increase in inverse proportion to a spectral bandwidth of the waves, which determines coherence of the beam.

The beam transferring medium 320 may be a device for transferring the beam generated by the light source 310, and include, for example, an optical fiber.

The beam emitter 330 may serve to irradiate, to the sample, the beam transferred by the beam transferring medium 320, and be provided at an end of the beam irradiation module 300 and inserted into a side of the sample accommodator module 200 to emit the beam from a side of the sample toward the sample.

The beam splitter 340 may split the beam generated by a single light source 310, for a plurality of beam emitters 330.

For example, a plurality of sample holes 201 may be provided in the sample accommodator module 200 to accommodate a plurality of containers 10 containing samples, and a plurality of beam emitters 330 may be provided to separately irradiate beams to the plurality of containers 10 accommodated in the plurality of sample holes 201.

Specifically, the beam splitter 340 may be fixed onto the body 100, and the beam generated by one light source 310 may be transferred through a plurality of beam transferring media 320 to the plurality of beam emitters 330.

In this case, the beams emitted from the plurality of beam emitters 330 may be irradiated to the containers 10 at the same wavelength and thus the beams of the same wavelength may be scattered by the bacteria or microorganisms included in the samples, thereby more accurately comparing the samples contained in the containers 10.

Figure 8:
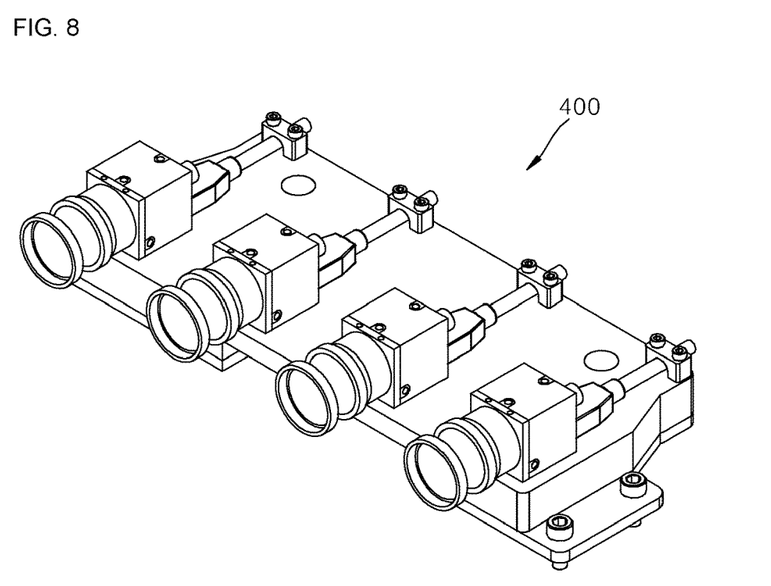
FIG. 8 is a perspective view of a sensor module of FIG. 3.

FIG. 8 is a perspective view of the sensor module 400 of the microorganism detection apparatus according to an embodiment of the present invention.

As illustrated in FIGS. 3 and 8, the sensor module 400 may detect speckles generated when the beam irradiated to the sample is scattered due to motion of the bacteria or microorganisms included in the sample.

The sensor module 400 may be inserted into another side of the sample accommodation block 210 to detect a beam image scattered by the sample from another side of the sample toward the sample. For example, the sensor module 400 may include a beam receiving part or a condenser lens for receiving a scattered beam.

The sensor module 400 may identify motion of the bacteria or microorganisms included in the sample by detecting subtle changes of the speckles.

The sensor module 400 may detect the speckles (e.g., laser speckles) generated when the irradiated beam is multiple-scattered by the sample, at preset timings or in an arbitrary time cycle.

The sensor module 400 may include a sensing means corresponding to the type of the beam and, for example, an imaging device such as a charge-coupled device (CCD) camera may be used when a beam having a visible wavelength band is used.

The sensor module 400 may be a camera capable of measuring 2-dimensional data, and a camera for measuring 1-dimensional data may also be used. The camera may be additionally configured with an optical system such as a microlens between the sample and the camera to minimize an autofocusing effect of the camera and overcome an optical distance to measure the speckles.

The sample hole 201 and the sensor module 400 may be configured in various manners to detect speckles.

For example, the beam may be irradiated to one sample hole 201 and thus a single sensor module 400 may detect speckles, or a plurality of sensor modules 400 may be provided at a plurality of portions of one sample hole 201 to detect speckles at the plurality of portions.

Alternatively, a plurality of sample holes 201 may be provided, different antibiotics or different doses of the same antibiotic may be administered to samples contained in the sample holes 201, and thus speckles scattered by the samples of the sample holes 201 may be detected.

The controller 500 may control the beam irradiated from the beam irradiation module 300, and store and analyze images detected by the sensor module 400.

Although not shown in the drawings, the controller 500 may include an emission controller, an image collector, an obtainer, a corrector, and an estimator.

The emission controller may be connected to the beam irradiation module 300 to control an emission cycle and an emission intensity of the beam irradiated from the beam irradiation module 300, the image collector may be connected to the sensor module 400 to store speckle images generated when the beam is multiple-scattered due to the bacteria or microorganisms included in the sample, the obtainer may obtain a temporal correlation of the speckles by using the detected speckles, the corrector may correct a deviation due to the difference in intensity of the beam when the beam irradiation module 300 irradiates the beam, and the estimator may estimate presence of bacteria or microorganisms in the sample or a concentration of the bacteria or microorganisms in real time.

Specifically, the controller 500 may obtain a temporal correlation of the speckles by using the detected speckles, and estimate presence of viruses in the sample or a concentration of the viruses in real time based on the temporal correlation.

That is, the controller 500 may control the sensor module 400 to detect subtle changes of beam paths over time due to subtle biological activities of microorganisms (e.g., motion in cells and migration of the microorganisms), and analyze a speckle pattern that changes due to the subtle changes of the beam paths.

As such, the biological activities of the microorganisms may be rapidly measured by measuring the temporal changes of the speckle pattern detected by the sensor module 400. In addition, when the changes of the speckle pattern over time are measured as described above, proliferation, inhibition, or reduction of the microorganisms over time may be identified by analyzing presence and concentration changes of the microorganisms included in the sample administered with an antibiotic.

For example, the sensor module 400 may detect a first image before administration of the antibiotic and a second image after administration of the antibiotic and transmit the first and second images to the controller 500, and the controller 500 may analyze changes between the received first and second images.

For example, when the bacteria or microorganisms included in the sample do not move, coherent speckles exhibit no changes in an interference pattern over time. That is, when there is no motion, a pattern of coherent speckles may have a certain interference pattern in coherent speckle images measured every reference time. As described above, when the coherent speckle images exhibit no or little changes in an interference pattern over time, the controller 500 may determine that the bacteria and microorganisms in the sample are reduced and destroyed to death.

On the other hand, when the pattern of the coherent speckles changes, the controller 500 may estimate that the bacteria and microorganisms remain in the sample. That is, when the bacteria or microorganisms are present in the sample, the bacteria and microorganisms may proliferate and continuously move as time passes. The pattern of the laser speckles may continuously change over time due to the motion of the bacteria and microorganisms, and thus the controller 500 may determine that the bacteria and microorganisms still remain in the sample when the pattern of the coherent speckles changes by more than a predetermined error range in the coherent speckle images measured every reference time.

The controller 500 may control the sensor module 400 to detect speckles at a larger number of timings.

As illustrated in FIG. 1, the case 600 may include a cover 610 capable of covering the sample accommodator module 200 not to expose the sample to an external environment when the container 10 is put in the sample accommodator module 200 for a test.

The case 600 may be a structure having an accommodation space to accommodate the sample accommodator module 200, the beam irradiation module 300, the sensor module 400, and the controller 500, and having sufficient strength and durability to support the same.

Figure 9:
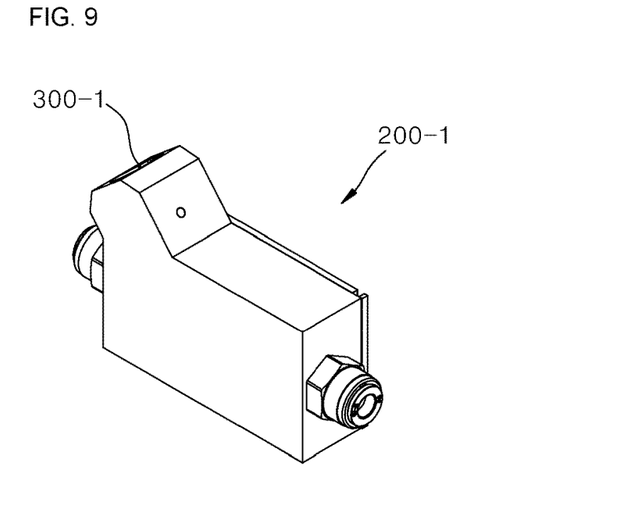
FIG. 9 is a perspective view of a sample accommodator module according to another embodiment of the present invention.
Figure 10:
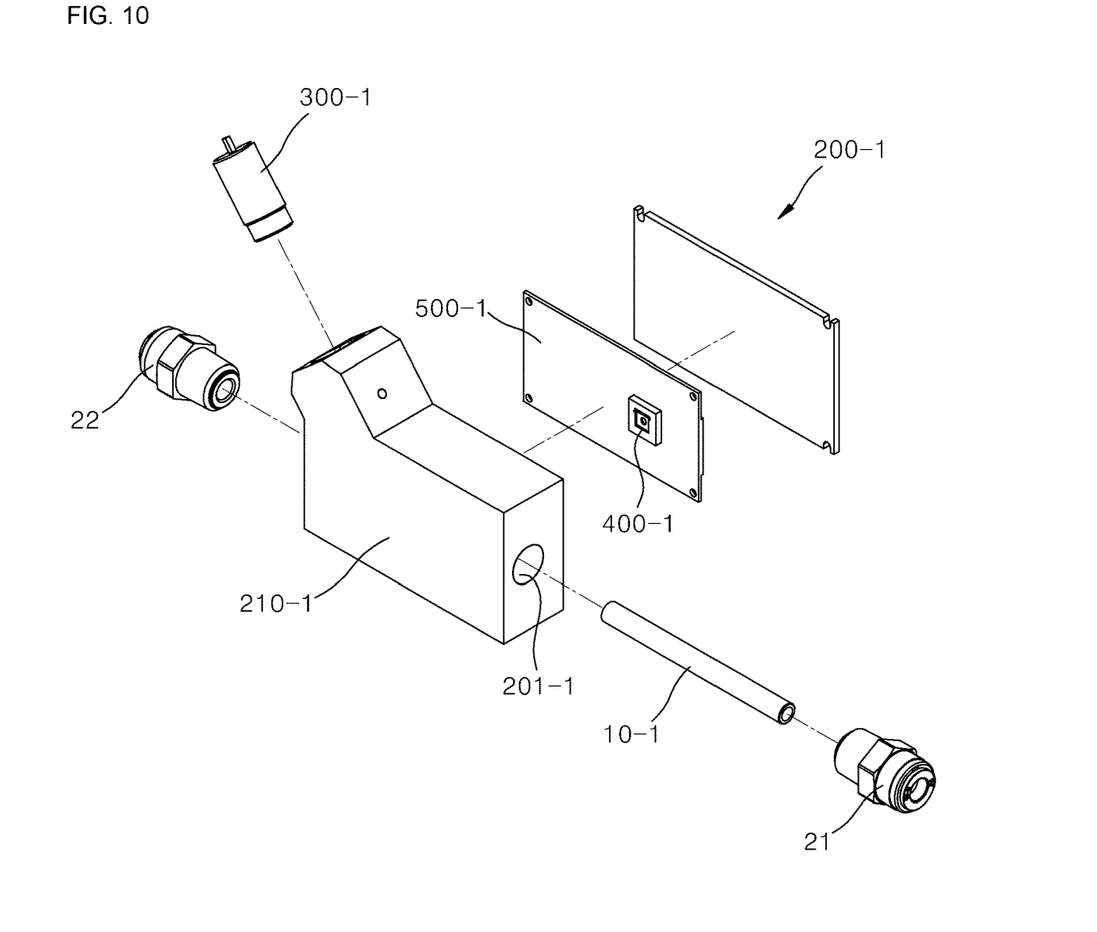
FIG. 10 is an exploded perspective view of the sample accommodator module of FIG. 9.
Figure 11:
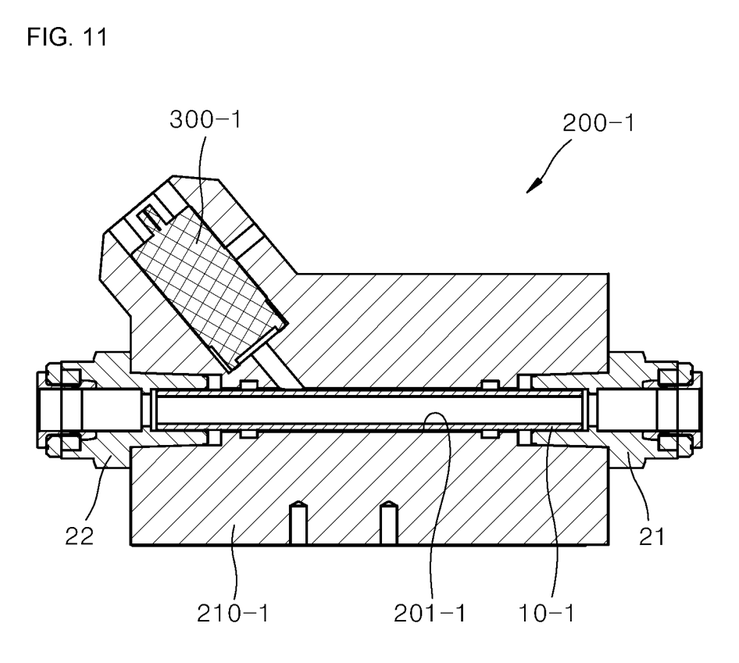
FIG. 11 is a cross-sectional view of the sample accommodator module of FIG. 9.

FIG. 9 is a perspective view of a sample accommodator module 200-1 according to another embodiment of the present invention, FIG. 10 is an exploded perspective view of the sample accommodator module 200-1, and FIG. 11 is a cross-sectional view of the sample accommodator module 200-1.

As illustrated in FIGS. 9 to 11, the sample accommodator module 200-1 may include a sample accommodation block 210-1, a sample accommodation block cover, a first joint 21, and a second joint 22.

The sample accommodation block 210-1 may have, at a side thereof, a hole capable of accommodating a beam irradiation module 300-1, be connected to a sensor module 400-1 at another side thereof, and have a sample hole 201-1 capable of accommodating the container 10-1.

The sample hole 201-1 may be provided in a through-hole shape into which a tube-shaped container 10-1 is inserted, and both ends of the inserted container 10-1 may be fixed to the sample accommodation block 210-1 by the first and second joints 21 and 22.

In this case, the container 10-1 may be provided in a tube shape through which the sample may flow, and accommodate the sample by blocking the flow of the sample by using valves (not shown) provided at both ends thereof.

By eliminating non-uniformity of the surface of the sample hole 201-1, surface treatment may be performed in such a manner that a beam scattered by the sample accommodated in the sample hole 201-1 may be uniformly reflected on the surface of the sample hole 201-1.

The sample accommodation block 210-1 may be made of aluminum having excellent thermal conductivity and high light reflectance.

The beam irradiation module 300-1 may irradiate a beam in an inclined direction from a side surface of the container 10-1 to generate speckles based on reflection and scattering in the container 10-1, and the sensor module 400-1 provided at another side may detect the speckles.

The controller 500 may be provided in the body 100 as illustrated in FIG. 5, or an accommodator capable of accommodating a controller 500-1 may be provided on at least a side of the sample accommodation block 210-1 and the controller 500-1 may be provided in the sample accommodation block 210-1 as illustrated in FIG. 11. Functions of the controller 500-1 are the same as those described above.

As described above, to test antibiotic susceptibility of samples including bacteria or microorganisms by using laser speckles, a microorganism detection apparatus according to the present invention may directly incubate samples and rapidly and accurately detect presence and proliferation of bacteria or microorganisms included in the incubated samples by using laser speckles.

According to the afore-described embodiments of the present invention, motion of bacteria or microorganisms included in samples may be detected using laser speckles. As such, a microorganism detection apparatus capable of testing antibiotic susceptibility of bacteria or microorganisms within a short time by testing reactivity of the bacteria or microorganisms to antibiotics by using laser speckles, of conducting both incubating and testing within the apparatus by controlling temperature without relocating samples incubated in an incubator, and of minimizing vibration to least influence speckle image detection results may be implemented. However, the scope of the present invention is not limited to the above-described effect.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A microorganism detection apparatus comprising:
a body;
a sample accommodator module provided in the body to accommodate a sample;
a beam irradiation module for irradiating a beam to the sample;
a sensor module for detecting speckles generated when the beam irradiated to the sample is scattered due to motion of bacteria or microorganisms comprised in the sample; and
a controller for controlling the beam irradiated from the beam irradiation module, and storing and analyzing images detected by the sensor module;
wherein the sample accommodator module comprises:
a sample accommodation block having a sample hole capable of accommodating a container containing the sample; and
a heater for supplying heat to the bacteria or microorganisms in the sample at a preset temperature,
wherein the sample accommodation block is made of aluminum, and
wherein the sample accommodation block comprises:
a block body;
a first block surrounding at least a portion of the block body;
a second block surrounding at least another portion of the block body;
an irradiator accommodator provided at a side of the sample accommodation block and connected to the sample hole to accommodate at least a portion of the beam irradiation module;
an image detector provided at another side of the sample accommodation block and connected to the sample hole to allow the sensor module to detect an image scattered by the sample, and
wherein the irradiator accommodator comprises:

a first irradiator hole provided in a side surface of the block body in a hole shape into which an end of the beam irradiation module is inserted;

a second irradiator hole provided at a side of the first block to surround a lower side of a portion of the beam irradiation module; and a third irradiator hole provided at a side of the second block to correspond to the second irradiator hole and surround an upper side of the portion of the beam irradiation module.

2. The microorganism detection apparatus of claim 1, wherein the heater uses a Peltier element or resistance heating.

3. The microorganism detection apparatus of claim 1, wherein the beam irradiation module comprises:

a light source for generating the beam;

a beam transferring medium for transferring the beam generated by the light source; and a beam emitter for irradiating, to the sample, the beam transferred by the beam transferring medium.

4. The microorganism detection apparatus of claim 3, wherein the light source comprises a laser capable of irradiating a beam of a certain wavelength, and wherein the beam transferring medium comprises an optical fiber.

5. The microorganism detection apparatus of claim 3, wherein a plurality of sample holes are provided in the sample accommodator module to accommodate a plurality of containers containing samples, and wherein the beam irradiation module further comprises a beam splitter for splitting the beam generated by a single light source, for a plurality of beam emitters.

6. The microorganism detection apparatus of claim 1, wherein the sample accommodator module further comprises a ball plunger inserted into the sample accommodation block to press at least a portion of the container and fix the container to the sample accommodation block when the container is inserted into the sample accommodation block.

7. The microorganism detection apparatus of claim 1, further comprising a case comprising a cover capable of covering the sample accommodator module not to expose the sample to an external environment when the container is put in the sample accommodator module for a test.

8. The microorganism detection apparatus of claim 1, wherein the container is provided in an overall pillar shape having a top opening and a bottom surface, and comprises a beam entering part corresponding to the beam irradiation module and a beam receiving part corresponding to the sensor module, wherein the beam entering part and the beam receiving part are misaligned to amplify the speckles generated by the beam irradiation module and detected by the sensor module.

9. The microorganism detection apparatus of claim 1, wherein the controller obtains a temporal correlation of the speckles by using the detected speckles, and estimates presence of bacteria or microorganisms in the sample or a concentration of the bacteria or microorganisms in real time based on the temporal correlation.

* * * * *